United States Patent [19]

Schmitt et al.

[11] Patent Number: 4,643,219
[45] Date of Patent: Feb. 17, 1987

[54] VALVE FOR REGULATING THE PASSAGE OF A FLUID

[75] Inventors: Manfred Schmitt, Friedelsheim; Herbert Illius, Lampertheim, both of Fed. Rep. of Germany

[73] Assignee: Bopp & Reuther, Mannheim, Fed. Rep. of Germany

[21] Appl. No.: 513,987

[22] Filed: Jul. 14, 1983

[30] Foreign Application Priority Data

Jul. 14, 1982 [DE] Fed. Rep. of Germany ....... 3226274

[51] Int. Cl.⁴ .............................................. F16K 25/00
[52] U.S. Cl. .................................. 137/454.6; 137/549; 137/554; 137/559; 251/14; 251/48; 251/64; 251/63.5; 251/129.03
[58] Field of Search ................... 137/454.2, 454.6, 554, 137/549, 559; 251/14, 48, 64, 63.5, 130, 332, 89, 95, 68, 69

[56] References Cited

U.S. PATENT DOCUMENTS

| 512,570 | 1/1894 | Thomlinson | 251/14 |
|---|---|---|---|
| 648,591 | 5/1900 | Metzger | 137/454.2 X |
| 2,045,823 | 6/1936 | Barrow | 251/89 X |
| 2,217,141 | 10/1940 | Sprenkle | 251/14 X |
| 2,571,378 | 10/1951 | Parisi | 137/554 X |
| 3,200,839 | 8/1965 | Gallagher | 251/332 X |
| 3,789,875 | 2/1974 | McGee | 251/14 X |
| 4,103,863 | 8/1978 | Houlgrave | 251/63.5 X |
| 4,207,915 | 6/1980 | Becker | 137/549 X |
| 4,248,263 | 2/1981 | Langill | 137/454.2 |
| 4,285,495 | 8/1981 | King | 251/63.5 |
| 4,311,167 | 1/1982 | Stoves | 137/454.2 |

FOREIGN PATENT DOCUMENTS 2310504 12/1976 France ............................. 137/454.2

*Primary Examiner*—Harold W. Weakley
*Attorney, Agent, or Firm*—Michael J. Striker

[57] ABSTRACT

A valve for regulating the passage of a fluid through pipes, in particular pipes having a large diameter, has a valve housing and a valve unit. The valve unit includes a spindle movable in vertical direction in the housing and is connected to a valve disk which reciprocates in a flow cylinder having a perforated casing. The spindle is further connected to a lifting cylinder which provides the movement of the spindle and the valve disk between a shutoff position and an open position. The valve unit of the valve is insertable into the housing and removable therefrom in its entirety without necessitating a dismantling of the housing.

4 Claims, 2 Drawing Figures

F I G. 2
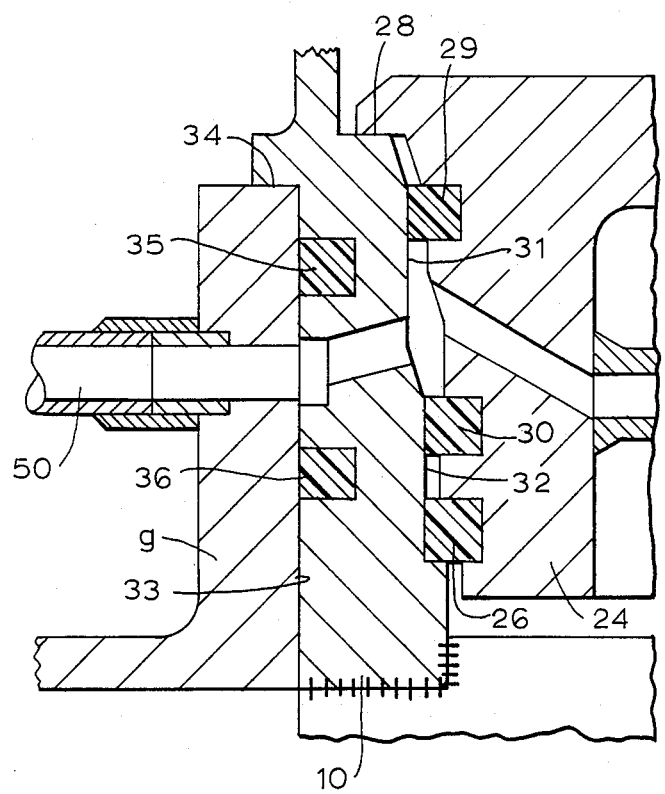

VALVE FOR REGULATING THE PASSAGE OF A FLUID

BACKGROUND OF THE INVENTION

The invention relates to a valve for regulating the passage of a fluid through pipes, in particular ventilation pipes and/or rinsing pipes of large diameter, which pipes are to be connected to safety containers for nuclear reactors.

For the continuous ventilation of safety containers for nuclear reactors, ventilation pipes of large diameter are arranged at the safety container which pipes are provided with shutoff valves for safety reasons, so that the safety container can be immediately gas-tightly sealed against the outside upon occurrence of complications. Such shutoff valves are also provided in the rinsing line through which the safety container is cleaned after such a disturbance took place.

Until now, shutoff flaps have been provided in ventilation pipes and in rinsing pipes of the safety container. For actuation of the flap disk, a lever gearing has been used consisting of several toggle joints, so that the flap disk is first pivoted in a position plane-parallel with the housing seat until shortly before the shutoff position is attained, and thereafter is pressed on the housing seat in essentially axial direction. Through this plane-parallel engagement of the flap disk into the housing seat, the required tightness in the flap seat is achieved despite the large diameter of the ventilation and rinsing pipes, but such a lever gearing is rather complicated and cumbersome. Moreover, the drive shaft which must provide the driving moment during the opening and the braking moment during the closing has to be guided outwardly through the housing wall, so that the shutoff device becomes very cumbersome, especially when considering the required quality of the sealing in nuclear reactors. A further disadvantage resides in the fact that the entire shutoff flap must be disassembled from the pipeline in order to inspect the movable flap part and the housing seat during the inspections periodically occurring in nuclear power stations.

SUMMARY OF THE INVENTION

It is therefore the object of the present invention to avoid the prior art disadvantages.

More particularly, it is the object of the present invention to provide a shutoff valve for the ventilation lines and rinsing lines of safety containers in stead of the known shutoff flaps.

Yet another object of the invention is to provide a shutoff valve which is simple in construction and of small dimensions so as to allow inspections thereof in an easy manner.

A concomitant object of the present invention is to provide a shutoff valve which is easy to inspect without necessitating the disassembly of the valve housing from the pipeline.

In keeping with these objects and with others which will become apparent hereinafter, one feature of the invention resides in a valve for regulating the passage of a fluid through pipes which comprises a housing, a spindle movable in vertical direction in the housing, means for supporting the spindle in the housing, first means for shutting off and opening the passage through the valve and being associated to the spindle, means for moving the spindle in vertical direction between a first position in which the passage of the fluid through the valve is shut off and a second position in which the passage opens, and second means for holding the spindle in the second position during passage of the fluid through the valve and for releasing the spindle when the passage is to be shut off the spindle, the supporting means, the first means, the moving means and the second means being parts of a unit which is insertable into and removable from the housing in its entirety.

Such a valve unit can be easily withdrawn from the valve housing by simply removing the housing cover so that all essential valve parts including the valve set are easily accessible for check of their unobjectionable state. Since according to another feature of the invention the guide bearings for the valve spindle are integrated into the removable valve unit, the coordination between the movable and the fixed valve parts is kept unchanged after the withdrawal of the unit, so that the movements of the individual valve parts can be inspected outside of the valve housing on the dismantled valve unit during the periodically required inspections.

According to another feature of the invention, the first means includes a valve disk which is connected to the spindle so as to be movable simultaneously with the spindle between the first and second positions, a valve seat engageable with the housing and cooperating with the valve disk so that the valve disk abuts the valve seat when moved into the first position and a flow cylinder including a perforated casing having a lower end connected to the valve seat, and a connector plate, the upper end of the casing being covered by one surface of the connector plate, the casing surrounding the valve disk and extending parallel to the spindle along the entire valve stroke of the valve disk.

The moving means which are provided for moving the spindle in vertical direction include a lifting cylinder supported by the other surface of the connector plate and having an upper part, a piston slidably guided within the lifting cylinder and being connected to the spindle so as to move the spindle between the first and the second positions, and a cover plate for closing the upper part of the lifting cylinder.

Since the lifting cylinder is arranged directly above the flow cylinder and is connected with the flow cylinder in a tight manner through the connector plate, and the upper housing socket of the housing which permits access to the valve unit for assembling and disassembling thereof, is simultaneously dimensioned to accommodate the upper part of the unit carrying the lifting cylinder, an especially compact unit is obtained.

The perforated casing of the flow cylinder is connected via the valve seat to the lower guide bearing for the valve spindle via radial ribs extending between the lower guide bearing and the valve seat. Since the upper end of the casing is connected in a tight manner to the connector plate, a closed and rigid valve cylinder body is obtained which accommodates separated from the valve housing the entire spindle guide and simultaneously forms a receiving chamber for the valve disk moving along the respective valve stroke.

The housing of the valve includes a cylinder jacket, a separating wall inwardly projecting from the cylinder jacket, a supporting ring integral with the separating wall, wherein the valve seat being engageable with the supporting ring and sealed thereagainst by at least one sealing ring located in the valve seat, a housing socket projecting outwardly from the cylinder jacket in parallel direction to the spindle and a cover for closing the housing socket and providing access to the unit. Due to the arrangement of the valve seat and the supporting ring and its cooperation with each other, the entire valve unit is supported at the supporting ring of the separating wall of the housing. The sealing of the valve seat against the supporting ring is obtained through elastic deformation of the sealing ring during insertion of the valve unit. It is to be noted that the valve seat is part of the valve unit and is removable from the housing together with the unit.

The perforated casing provided above the valve seat causes in addition a uniform distribution of the fluid flowing through the housing seat along the entire circumference of the valve seat, so that the shearing forces inherent to the flow and consequently the frictional forces inhibiting the movement of the valve part can be kept to a minimum.

The cylinder jacket of the housing is provided inclined with respect to the spindle, thereby achieving a favorable fluid guidance through the valve housing with respect to the flow, thereby rendering possible smaller dimensions of the entire valve in comparison to for example a Z-shaped housing upon equal rate of flow and equal pressure drop. In particular, the diameter of the valve housing which is developed as a pipe cylinder can be adjusted to the connecting pipeline so that otherwise necessary transition pieces are not necessary for an expansion.

Preferably, the cylinder jacket of the lifting cylinder is provided in the vicinity of the lower end of the valve stroke with one or several relief openings which are passed by the piston so that in case of disturbance the valve spindle together with the piston and the valve disk when moving into the shutoff position of the valve through gravity during the switchoff of the holding magnet, are decelerated shortly before impingement of the valve disk on the valve seat.

In addition to the deceleration of the valve spindle, piston and valve disk by the relief openings, the valve disk is preferably provided with an elastic damping ring which impinges an abutment provided by the valve seat directly before occupying the shutoff position of the valve and thus provides a second deceleration step in order to prevent a hard impingement of the valve disk on the valve seat.

Preferably, the valve is provided with means for indicating the open and shutoff position of the valve disk and includes limit switches which are arranged directly beneath the cylinder jacket of the valve housing so that the limit switches are easily accessible and can be checked and adjusted during the assembly and occurring inspections. The indicating means further includes a freely movable switching bar which moves only during the end of the opening stroke, so that the valve spindle can be provided with such a dimension that it only projects slightly beyond the cylinder jacket.

According to an especially advantageous feature of the invention, the connector plate covers the casing on the one hand and simultaneously is the bottom plate for the lifting cylinder on the other hand, so that the unit is further simplified by this feature.

The novel features which are considered characteristic for the invention are set forth in particular in the appended claims. The invention itself, however, both as to its construction and its method of operation, together with additional objects and advantages thereof, wil be best understood from the following description of specific embodiments when read in connection with the accompanying drawing.

BRIEF DESCRIPTION OF THE DRAWING

FIG. 2 is a sectional view of a part of the valve according to FIG. 1, illustrating the relationship between a supporting ring, valve seat and valve disk.

DESCRIPTION OF THE PREFERRED EMBODIMENTS

Figure 1:
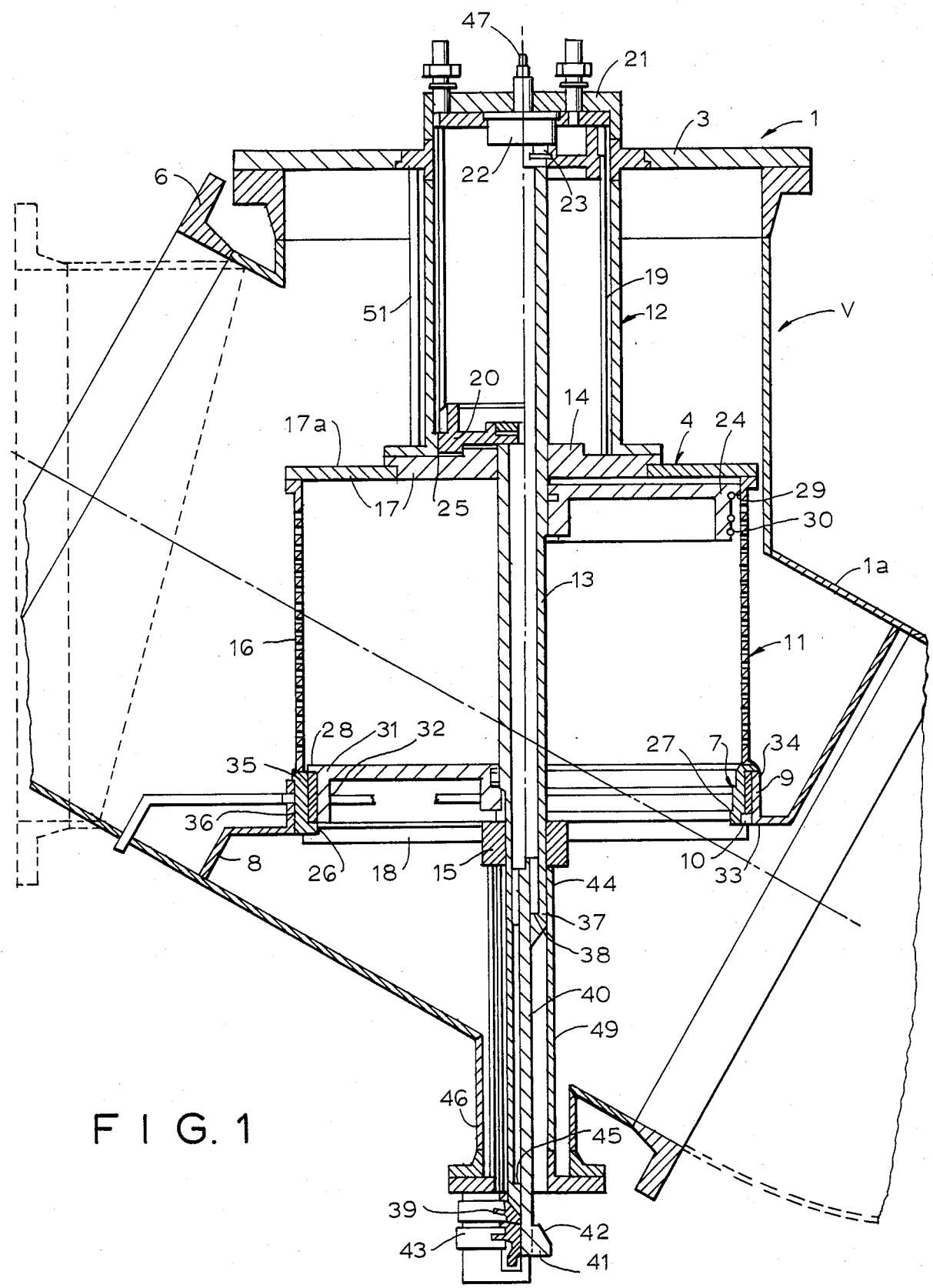
FIG. 1 shows a valve according to the invention.

In FIG. 1, there is shown a shutoff valve V consisting of a valve housing 1 and a valve unit 4. The valve housing 1 includes a cylindrical jacket 1a which is arranged in an inclined manner and an upper socket 2 which projects outwardly from the cylinder jacket 1a in a vertical direction. The socket 2 is covered by a cover 3. Each end section of the cylinder jacket 1a is provided with a flange 5, 6 through which the valve housing 1 is connected to ventilation lines of a safety container or to a connecting piece of a container wall. In view of the large dimensions of the safety container to be ventilated, the cylinder jacket 1a has a large diameter of for example 500 mm.

The cylinder jacket 1a is further connected with a separating wall 8 which projects inwardly from the cylinder jacket 1a and is provided at its end which is remote to the cylinder jacket 1a with a horizontal supporting ring 9 which supports the entire unit 4 in a manner to be described hereinbelow.

The valve unit 4 consists of a flow cylinder 11 and a lifting cylinder 12 which cooperates with a valve spindle 13 extending in vertical direction parallel to the socket 2. The flow cylinder 11 includes a perforated casing 16 having one end facing the lifting cylinder 12 connected to a connector plate 17. The lower end of the casing 16 is fixedly connected to a seat ring 10 which provides the valve seat and which is engageable with the supporting ring 9 upon assembling of the valve unit 4 within the housing 1. The connector plate 17 is formed of two parts for improved accommodation of the leakage suction bore hole 51 and includes a first part 17a which is in connection with the casing and an inner part which constitutes an upper guide bearing 14 which provides guidance of the valve spindle 13. A second guide bearing 15 is provided at a lower portion of the valve spindle 13 for guidance and support thereof. The lower guide bearing 15 for the valve spindle 13 is fixedly connected to the seat ring 10 via radial ribs 18. Consequently, the flow cylinder 11 is closed and is provided with the integrated guide bearings 14, 15 for the valve spindle.

As can be seen from FIG. 1, the other side of the connector plate 17 supports a cylinder pipe 19 of the lifting cylinder 12. Therefore, the inner part of the connector plate 17 is thus forming the guide bearing 14 and simultaneously the bottom part of the lifting cylinder 12. Within the cylinder pipe 19 of the lifting cylinder 12, a reciprocating piston 20 is provided which is connected on the upper end of the valve spindle 13. The upper end of the lifting cylinder 12 which projects beyond the cover 3 of the housing 1 is covered by the top plate 21 which carries a holding magnet 22 by connecting and fixing means 47 so that the magnet 22 projects into the interior of the lifting cylinder. The valve spindle 13 is provided with a holding plate 23 which cooperates with the holding magnet 22 in such a manner that in the open position of the valve, the holding plate 23 is held by the magnet and thus maintains the spindle in its upper position.

Connected to the valve spindle 13 is a valve disk 24 which reciprocates within the casing 16. As can be seen by the right half of FIG. 1, the piston 20 has moved the spindle 13 in its upper position, thereby moving the valve disk 24 into its open position as well. In the left half of FIG. 1, the shutoff position is illustrated in which the valve disk 24 is in engagement with the valve seat 7 and thus shuts off any passage through the valve.

The cylinder pipe 19 of the cylinder 12 is provided with a relief opening 25 which is arranged in the lower area of the lifting cylinder 12 and is passed by the piston 20 during the shutting off step shortly before occupying its end position so that the shutoff step is decelerated in its end phase. The valve disk 24 which reciprocates within the casing 16 is further provided with an elastic damping ring 26 which engages an abutment 27 of the seat ring 10 shortly before occupying the valve shutoff position as illustrated in the left half of FIG. 1, so that a hard impingement of the metallic stop surface 28 of the valve disk 24 on the seat ring 10 is essentially prevented.

The piston 20 causes through lifting of the valve spindle 13 together with the valve disk 24 the opening movement of the valve, while the opening position is maintained through switching on of the holding magnet 22. Consequently, the lifting cylinder 12 need not be continuously kept under air pressure for maintaining the upper position of the piston 20, and consequently the shutoff valve due to the immediate discharge of the lifting air can easily be brought into its shutoff position by the inherent weight of the movable valve parts, i.e. the valve spindle 13, the valve disk 24 and the piston 20 upon complications by switching off the current or upon power failure.

As can be especially seen from FIG. 2, the valve disk 24 is further provided with sealing rings 29, 30 which abuts corresponding sealing surfaces 31, 32 of the seat ring 10 during shutoff of the valve. The valve disk 24 as well as the seat ring 10 and the supporting ring 9 is provided with aligned through holes 50 for providing a connection to the outside for leakage suction.

For performing the inspections periodically occurring in nuclear power plants, the circular cover 3 which closes the housing socket 2 in the area outside of the lifting cylinder 12 is screwed off the socket 2. The screws are indicated in FIG. 1 by dash-dot lines. Consequently, the entire valve unit 4 can be withdrawn upwardly out of the valve housing 1, including with the seating ring 10 which is guided in the supporting ring 9 of the separating wall 8. Furthermore, in addition to the upper guide bearing 14, also the lower guide bearing 15 which is fixed via the radial ribs 18, as well as the valve spindle 13, is withdrawn upwardly. The valve housing 1 remains fixedly connected with its flanges 5, 6 with the ventilating line or the connecting piece of the safety container wall. After carrying out the inspection and maintenance, the valve unit 4 is inserted from above into the housing socket 2 and into the cylinder jacket 1a in a manner that the seat ring 10 engages with the inner wall 33 of the supporting ring 9 and is centrically guided and inserted until stop member 34 of the seat ring abuts the upper surface of the supporting ring 9. As can be especially seen from FIG. 2, the seat ring 10 is provided with outer sealing rings 35, 36 which provide the sealing against the inner wall 33 of the supporting ring 9. After screwing of the cover 3 to the socket 2, the shutoff valve is usable again.

The valve spindle 13 is hollow and is connected to indicating means for providing the operator with the information concerning the position of the valve disk. In obtaining the indication thereof, the valve spindle 13 has a lower end provided with a cone-shaped trigger cam 37 which has a surface 38 cooperating with a limit switch 39. When the spindle is in its lower position and thus the valve disk 24 shuts off the valve, the trigger cam 37 depresses the limit switch 39 thereby indicating the respective position of the valve disk. For indication of the open position of the valve, the interior of the hollow spindle 13 accommodates a switching bar 40 which has a lower end projecting from the lower end of the hollow spindle 13 provided with a counter trigger cam 41 which is provided with a surface 42 cooperating with a second limit switch 43. Consequently, when the spindle 13 and thus the valve disk 24 occupy the open position, the counter trigger cam actuates the limit switch 43 and indicates to the operator the respective position. The switching bar 40 is slidably supported in the hollow spindle 13 and is provided at its upper end with a catch 44 which contacts the catch 45 of the trigger cam 37 shortly before obtaining the open position of the valve during the upward movement of the valve spindle 13 so that the switching bar 40 is moved with the valve spindle 13 only in the last phase of the opening movement and only along a short path, thereby actuating the limit switch 43.

As can be seen from FIG. 1, a further tubular housing portion 49 is provided for preventing the fluid from penetrating to the trigger cam 37 and counter trigger cam 41.

Through the provision of such indicating means, the limit switches 39, 43 are accessible easily from the outside and the valve spindle 13 projects only slightly from the cylinder jacket 1 in downward direction, so that the bottom socket 46 projecting from the cylinder jacket 1a downwardly and accommodating the limit switches 39 and 43 can be developed of small dimensions and thus hardly increases the size of the shutoff valve. In combination with the upper short housing socket 2 and the inclined cylinder jacket 1a, a shutoff valve of small dimensions is obtained which especially for nuclear power plants is of advantage due to the limited space for the assembly.

It will be understood that each of the elements described above, or two or more together, may also find a useful application in other types of valves for regulating the passage of a fluid differing from the types described above.

While the invention has been illustrated and described as embodied in a valve for regulating the passage of a fluid, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A valve for regulating the passage of a fluid through a pipe, and in particular of a pipe having a large diameter, comprising: a housing; a spindle movable in vertical direction in the housing; means for supporting the spindle within the housing; first means for shutting off and opening the passage through the valve and being associated to the spindle; means for moving the spindle in vertical direction between a first position in which the passage of the fluid through the valve is shut off and a second position in which the passage is opened; second means for holding the spindle in the second position during passage of the fluid through the valve and for releasing the spindle when the passage is to be shut off, the spindle, the supporting means, the first means, the moving means and the second means being parts of a unit which is insertable into and removable from the housing in its entirety, said second means including a holding member provided on said spindle and a holding magnet positioned on said moving means and cooperating with the holding member in such a manner that the spindle is held in said second position during passage of the fluid through the valve, said first means including a valve disk connected to the spindle so as to be movable simultaneously with the spindle between the first and the second position; a valve seat engageable with the housing and cooperating with the valve disk so that the valve disk abuts the valve seat when moved into the first position; and a flow cylinder including a perforated casing having a lower end connected to the valve seat, and a connector plate, wherein the upper end of the casing is covered by one surface of the connector plate, the casing surrounding the valve disk and extending parallel to the spindle along the entire valve stroke of the valve disk, said moving means including a lifting cylinder supported by the other surface of the connector plate and having an upper part, a piston slidably guided within the lifting cylinder, the piston being connected to the spindle so as to move the valve disks between the first and the second position, and a cover plate for closing the upper part of the cylinder and connected to said holding magnet, said supporting means including a lower guide bearing for supporting a lower portion of the spindle, an upper guide bearing integrally connected with the connector plate and supporting an upper portion of the spindle, and at least one rib extending radially with respect to the spindle and connecting the lower guide bearing with the valve seat, said housing including a cylinder jacket, a separating wall inwardly projecting from the cylinder jacket, a supporting ring integral with the separating wall, the valve seat being engageable with the supporting ring and sealed thereagainst by at least one sealing ring located in the valve seat, a housing socket projecting outwardly from the cylinder jacket in parallel direction to the spindle, and a cover for closing the housing socket and providing access to the unit.

2. A valve as defined in claim 1, wherein the cylinder jacket is inclined with respect to the spindle.

3. A valve as defined in claim 1, wherein the valve disk is provided with one elastic damping ring, the valve seat having an abutment cooperating with the elastic ring for preventing a hard impingement of the valve disk on the valve seat.

4. A valve as defined in claim 1, wherein the connector plate covers the casing and simultaneously forms a bottom of the lifting cylinder.

* * * * *